United States Patent
Staiger et al.

(10) Patent No.: US 7,153,914 B2
(45) Date of Patent: Dec. 26, 2006

(54) ADDITION-CROSSLINKING SILICONE RESIN COMPOSITIONS

(75) Inventors: Gerhard Staiger, Kirchdorf (DE); Wolfgang Schattenmann, Burghausen (DE)

(73) Assignee: Wacker Chemie AG, Munich (DE)

( * ) Notice: Subject to any disclaimer, the term of this patent is extended or adjusted under 35 U.S.C. 154(b) by 189 days.

(21) Appl. No.: 11/010,683

(22) Filed: Dec. 13, 2004

(65) Prior Publication Data

US 2005/0137328 A1 Jun. 23, 2005

(30) Foreign Application Priority Data

Dec. 18, 2003 (DE) ............................... 103 59 705

(51) Int. Cl.
*C08L 83/04* (2006.01)
(52) U.S. Cl. .................... 525/478; 528/15; 528/31; 528/32; 528/43
(58) Field of Classification Search .............. None
See application file for complete search history.

(56) References Cited

U.S. PATENT DOCUMENTS

| | | |
|---|---|---|
| 3,284,406 A | 11/1966 | Nelson |
| 3,436,366 A | 4/1969 | Modic |
| 4,198,131 A | 4/1980 | Birdsall et al. |
| 4,260,726 A | 4/1981 | Deubzer et al. |
| 5,444,105 A | 8/1995 | Ornstein |
| 5,548,038 A * | 8/1996 | Enami et al. ............... 525/478 |
| 6,285,513 B1 | 9/2001 | Tsuji et al. |
| 2002/0161140 A1* | 10/2002 | Yoneda et al. ............... 526/90 |

FOREIGN PATENT DOCUMENTS

EP 1 249 873 A2 10/2002

* cited by examiner

*Primary Examiner*—Marc S. Zimmer
(74) *Attorney, Agent, or Firm*—Brooks Kushman P.C.

(57) ABSTRACT

Addition-crosslinking silicone resin compositions containing selected high functionality addition curable organosilicon compounds can be cured at relatively low temperatures and can produce highly transparent, hard polymers which are suitable for many uses, in particular for the potting or embedding of electrical componts such as LEDs.

17 Claims, No Drawings

ADDITION-CROSSLINKING SILICONE RESIN COMPOSITIONS

BACKGROUND OF THE INVENTION

1. Field of the Invention

The invention relates to addition-crosslinking silicone resin compositions and to the use thereof.

2. Background Art

Addition-crosslinking siloxanes have long been known in the area of elastomers, for example RTV-2 rubber, liquid rubber and addition-crosslinking hot rubber. Characteristically, these materials, when cured, have hardnesses in the Shore A range, or less than 20 Shore D. These crosslinkable materials are formulations comprising at least 2 components, which separately contain Si—H and Si-vinyl crosslinking functionalities.

U.S. published application 2002/0161140 A1 describes an addition-crosslinking phenylsilicone resin composition, the cured silicone resin having a hardness greater than Shore D 60. However, curing temperatures of 200° C. are required in order to avoid long curing times. The use of such compositions with heat-sensitive components such as electronic components or by molding in molds of organic polymer material is therefore impossible.

EP 1 249 873 A2 discloses the use of silicone resins which have a Shore A hardness in the range from 50 to 90 for the casting of "light emitting devices", so-called LEDs. A Shore A hardness in the region of 90 corresponds approximately to a Shore D hardness in the region of 40.

SUMMARY OF THE INVENTION

It was an object of the present invention to provide addition-crosslinking silicone resin compositions in which the abovementioned disadvantages are avoided, which can be cured at lower temperatures than in the past without long curing times, which give cured silicone resins having hardnesses greater than 40 Shore D, and which can be used together with heat-sensitive components such as electronic components or molds of organic polymer material. These and other objects are achieved by the invention.

DETAILED DESCRIPTION OF THE PREFERRED EMBODIMENT(S)

The invention relates to addition-crosslinking silicone resin compositions comprising (1) 100 parts by weight of a polyorganosiloxane of the general formula $$R^1_a R^2_b R^3_c SiO_{(4-a-b-c)/2} \quad (I)$$

in which $R^1$ is a monovalent, aromatic, optionally substituted hydrocarbon radical having 6 to 16 carbon atoms per radical, $R^2$ is a monovalent alkenyl radical having 2 to 10 carbon atoms per radical, $R^3$ is a monovalent radical selected from the group consisting of $C_1$–$C_{18}$-alkyl radicals and hydroxyl and $C_1$–$C_6$-alkoxy radicals, a, b and c (based on a siloxane unit) are 0, 1, 2 or 3, with the proviso that the sum a+b+c is ≦3 (based on a siloxane unit), and a, b and c, based on the average empirical formula (I), are on average 0.3≦a≦1.0, preferably 0.4≦a≦0.7,
0.1≦b<0.3, preferably 0.1≦b<0.25,
0.5≦c<1.5, preferably 0.9≦c≦1.4, the sum a+c being on average
1.0≦a+c<2.0, preferably 1.4≦a+c≦1.8, with the further proviso that at least two alkenyl radicals $R^2$, at least one aromatic radical $R^1$ and at least one unit of the formula $RSiO_{3/2}$ in which R is a radical $R^1$, $R^2$ or $R^3$, or $SiO_2$ are contained per molecule, (2) from 50 to 200 parts by weight, preferably from 80 to 150 parts by weight, of a polyorganosiloxane of the general formula $$R^1_d H_e R^3_f SiO_{(4-d-e-f)/2} \quad (II)$$

in which $R^1$ and $R^3$ have the meaning stated above therefor, d, e and f (based on a siloxane unit) are 0, 1, 2 and 3, with the proviso that the sum d+e+f is ≦3 (based on a siloxane unit), and d, e and f, based on the average empirical formula (II), are on average 0.3≦d≦1.0, preferably 0.4≦d≦0.7,
0.1≦e<0.4, preferably 0.1≦e≦0.25,
0.5≦f≦1.5, preferably 0.9≦f≦1.4, the sum d+f being on average
1.0≦d+f≦2.0, preferably 1.4≦d+f≦1.8, with the proviso that at least two Si-bonded hydrogen atoms and at least one aromatic radical $R^1$ are contained per molecule, or, instead of the components (1) and (2), (3) 200 parts by weight of a polyorganosiloxane of the general formula $$R^1_g R^2_h R^3_i H_k SiO_{(4-g-h-i-k)/2} \quad (III)$$

in which $R^1$, $R^2$ and $R^3$ have the meaning stated above therefor and g, h, i and k (based on a siloxane unit) are 0, 1, 2 and 3, with the proviso that the sum g+h+i+k is ≦3 (based on a siloxane unit), and g, h, i and k, based on the average empirical formula (III), are on average 0.3≦g≦1.0, preferably 0.4≦g≦0.7,
0.1≦h<0.3, preferably 0.1≦h≦0.2,
0.5≦i≦1.5, preferably 0.9≦i≦1.4,
0.1≦k≦0.4, preferably 0.1≦k≦0.2, the sum of g+i being on average
1.0≦g+i≦2.0, preferably 1.4≦g+i≦1.8, and the ratio of h to k is on average
0.7≦h/k≦1.3, preferably 0.8≦h/k≦1.1, with the further proviso that at least two alkenyl radicals $R^2$, at least two Si-bonded hydrogen atoms, at least one aromatic radical $R^1$ and at least one unit of the formula $RSiO_{3/2}$, in which R is a radical $R^1$, $R^2$ or $R^3$, or $SiO_2$ are contained per molecule, (4) from 1 to 100 parts by weight, preferably from 10 to 30 parts by weight, of an alkenyl-rich polyorganosiloxane of the general formula $$R^1_l R^2_m R^3_n SiO_{(4-l-m-n)/2} \quad (IV)$$

in which $R^1$, $R^2$ and $R^3$ have the meaning stated above therefor and l, m and n (based on a siloxane unit) are 0, 1, 2 and 3, with the proviso that the sum l+m+n is ≦3 (based on a siloxane unit), and l, m and n, based on the average empirical formula (IV), are on average
0≦l≦0.5, preferably 0≦l≦0.3,
0.6≦m≦1.0, preferably 0.8≦m≦1.0,
0.5≦n≦2, preferably 0.8≦n≦1.5, the sum l+m+n being on average
1.0≦l+m+n≦2.5, preferably 1.5≦l+m+n≦2.1, with the further proviso that at least two alkenyl radicals $R^2$ are contained per molecule, and, additionally or instead of component (4), (5) from 1 to 100 parts by weight, preferably from 5 to 30 parts by weight, of a hydrogen-rich polyorganosiloxane of the general formula

  (V)

in which
$R^1$ and $R^3$ have the meaning stated above therefor, and o, p and q (based on a siloxane unit) are 0, 1, 2 and 3, with the proviso that the sum o+p+q is ≦3 (based on a siloxane unit),
and o, p and q, based on the average empirical formula (V), are on average
0≦o≦0.5, preferably 0≦o≦0.3,
0.6≦p≦1.0, preferably 0.8≦p≦1.0,
0.5≦q≦2, preferably 0.8≦q≦1.2, the sum o+p+q being on average
1.0≦o+p+q≦2.5, preferably 1.5≦o+p+q≦2.1, with the further proviso that at least two Si-bonded hydrogen atoms are contained per molecule, and (6) a sufficient amount of a catalyst which promotes the addition of Si-bonded hydrogen to aliphatic double bonds.

The components (1) and (2) or, instead of (1) and (2) the component (3), are or is the base polymers or polymer which, expressed by the indices b and h, have or has a low density of alkenyl groups or, expressed by the indices e and k, have or has a low density of Si-bonded hydrogen atoms. The component (4), on the other hand, is rich in alkenyl groups, expressed by the substantially higher value for the index m, which may be at most m=1, i.e. at most one alkenyl group may be bonded to each Si atom. The component (5) is rich in Si-bonded hydrogen atoms, expressed by the substantially higher value for the index p, which may be at most p=1, i.e. at most one hydrogen atom may be bonded to each Si atom.

Examples of radicals $R^1$ are aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals. The phenyl and naphthyl radicals are preferred, the phenyl radical being particularly preferred.

Examples of alkenyl radicals $R^2$ are the vinyl, 5-hexenyl, cyclohexenyl, 1-propenyl, allyl, 3-butenyl and 4-pentenyl radicals, the vinyl radical being preferred.

Examples of radicals $R^3$ are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radical such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; and cycloalkyl radicals such as cyclopentyl, cyclohexyl, cycloheptyl and methylcyclohexyl radicals, the $C_1$–$C_6$-alkyl radical being preferred and the methyl radical being particularly preferred.

Examples of alkoxy radicals $R^3$ are the methoxy and ethoxy radical, the ethoxy radical being preferred. Preferred radicals $R^3$ are the methyl, hydroxyl, methoxy and ethoxy radicals.

The base polymer (1) is a polyorganosiloxane which contains siloxane units of the formula (I), in which, based on a siloxane unit, the indices a, b and c are 0, 1, 2 or 3, with the proviso that the sum a+b+c must be ≦3 per siloxane unit. The average values for the indices a, b and c give the average over all siloxane units of the polyorganosiloxane (1) and then result in an average empirical formula (I). The statements made regarding the base polymer (1) and the indices a, b and c also apply to the base polymer (2) having the indices d, e and f, to the base polymer (3) having the indices g, h, i and k, to the alkenyl-rich polyorganosiloxane (4) having the indices l, m and n and to the hydrogen-rich polyorganosiloxane having the indices o, p and q.

The base polymer (1) preferably contains from 0 to 80 mol %, preferably from 30 to 60 mol %, of $RSiO_{3/2}$ units (T units), R having the meaning stated above therefor, and is preferably $R^1$, preferably a phenyl radical, or $R^3$, preferably a methyl radical. The base polymer (1) can, however, also contain an MQ resin comprising $R_3SiO_{1/2}$ units (M units) and $SiO_2$ units (Q units). It may also contain D units, such as $R^1R^3SiO$ units, and $R^3{}_2SiO_{1/2}$ and $R^1R^3{}_2SiO_{1/2}$ units, $R^1$ preferably being a phenyl radical and $R^3$ preferably a methyl radical.

The polyorganosiloxanes (1) preferably have an average viscosity of from 200 to 10,000 mPa·s at 25° C., preferably from 700 to 3000 mPa·s at 25° C., while the polyorganosiloxanes (2) preferably also have an average viscosity of from 200 to 10,000 mPa·s at 25° C., preferably from 700 to 3000 mPa·s at 25° C.

Preferably, the component (3), instead of the components (1) and (2), is used as the base polymer. The base polymer (3) preferably contains the following siloxane units:

Q units: preferably from 0 to 60 mol %, more preferably 0 mol %, of $SiO_2$ units, T units: preferably from 0 to 80 mol %, more preferably from 30 to 80 mol %, of $RSiO_{3/2}$ units, R being a radical $R^1$, preferably a phenyl radical, or $R^3$, preferably a methyl radical, D units: preferably from 10 to 80 mol %, more preferably from 10 to 50 mol %, of $R^1{}_2SiO$ units, $R^1$ being a radical $R^2$, preferably vinyl radical, a radical $R^3$, preferably a methyl radical, hydroxyl radical or alkoxy radical, or a hydrogen atom, most preferably in each case from 10 to 20 mol % of MeViSiO and MeHSiO units, where Me is a methyl radical and Vi is a vinyl radical, and M units: preferably from 5 to 40 mol % of $R^1{}_3SiO^{1/2}$ units, $R^1$ being a radical $R^2$, preferably a vinyl radical, a radical $R^3$, referably a methyl radical, hydroxyl radical or alkoxy radical, or a hydrogen atom.

The polyorganosiloxanes (3) preferably have an average viscosity of from 200 to 10,000 mPa·s at 25° C., more preferably from 700 to 3000 mPa·s at 25° C. Polyorganosiloxanes (3) are described in U.S. Pat. No. 4,260,726.

The alkenyl-rich component (4) is preferably a linear polyorganosiloxane in which the alkenyl groups are preferably present in D units, such as $R^2R^3SiO$ units, the alkenyl radical $R^2$ preferably being a vinyl radical and the radical $R^3$ preferably a methyl radical. A preferred example of the alkenyl-rich polyorganosiloxane (4) is the following:

$$R^5_2SiO(R^4R^2SiO)_x(R^4_2SiO)_ySiR^5_2 \quad (VI)$$

in which
$R^2$ has the meaning stated above therefor,
$R^4$ is an alkyl radical having 1 to 18 carbon atoms,
$R^5$ is a radical $R^4$ or a hydroxyl or $C_1$–$C_6$-alkoxy radical,
x is an integer from 3 to 500 and
y is 0 or an integer from 1 to 250, preferably 0.

Preferably, the alkenyl-rich polyorganosiloxane of the formula (VI) contains $HOR^4SiO_{1/2}$ terminal groups, preferably contains from 5 to 50 alkenyl radicals $R^2$, preferably vinyl radicals, per molecule, and preferably has an average viscosity of from 5 to 200 mPa·s at 25° C., more preferably from 10 to 50 mPa·s at 25° C.

The hydrogen-rich component (5) is preferably a linear or cyclic polyorganosiloxane in which the Si-bonded hydrogen atoms are preferably present in D units such as $HR^3SiO$ units, the radical $R^3$ preferably being a methyl radical.

Polyorganosiloxanes of the general formula $$(HR^4SiO)_x \quad (VII)$$

and $$H_rR^4_{3-r}SiO(HR^4SiO)_s(R^4_2SiO)_tSiR^4_{3-r}H_r \quad (VI)$$

in which
$R^4$ has the meaning stated above therefor and
z is an integer from 3 to 7,
r is 0 or 1,
s is an integer from 3 to 50, and
t is 0 or an integer from 1 to 20, are preferred as hydrogen-rich component (5).

The hydrogen-rich polyorganosiloxanes (5) preferably contain from 4 to 50 hydrogen atoms per molecule, and preferably have an average viscosity of from 2 to 500 mPa·s at 25° C., preferably from 5 to 20 mPa·s at 25° C. Components (4) and (5) are preferably used together.

Si-bonded hydrogen in the base polymer (2) or (3) and in the hydrogen-rich polyorganosiloxane (5) is preferably present in amounts of from 0.5 to 1.2 gram atom, more preferably from 0.6 to 1.1 gram atom, of Si-bonded hydrogen per mole of alkenyl radical $R^2$ in the base polymer (1) or (3) and in the alkenyl-rich polyorganosiloxane (4).

In the inventive compositions, any catalysts which can be used for promoting addition of Si-bonded hydrogen to an aliphatic double bond can be used as catalysts. The catalysts are preferably a metal from the group consisting of the platinum metals or are a compound or a complex from the group consisting of the platinum metals. Examples of such catalysts are metallic and finely divided platinum, which may be present on supports such as silica, alumina or active carbon, compounds or complexes of platinum such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis(gamma-picolinyl)platinum dichloride, tetramethylenedipyridylplatinum dichloride, dicyclopentadienylplatinum dichloride, dimethylsulfoxyethyleneplatinum(II) dichloride, cyclooctadienylplatinum dichloride, norbornadienylplatinum dichloride, gamma-picolinylplatinum dichloride, cyclopentadienylplatinum dichloride, and reaction products of platinum tetrachloride with olefin and primary amine or secondary amine or primary and secondary amine, such as the reaction product of platinum tetrachloride dissolved in 1-octene with secbutylamine or ammonium-platinum complexes.

The catalyst is preferably used in amounts of from 20 to 2000 ppm by weight (parts by weight per million parts by weight), more preferably in amounts of from 50 to 500 ppm by weight, calculated in each case as elemental platinum and based on the total weight of the polyorganosiloxanes (1), (2) or (3), and (4) and (5).

The compositions which comprise components (1), (2) or (3) and (4) and/or (5) preferably have an average viscosity of from 200 to 10,000 mPa·s at 25° C., more preferably from 200 to 3000 mPa·s at 25° C., and most preferably from 700 to 2000 mPa·s at 25° C.

The compositions may also contain inhibitors, for example inhibitors which have previously been used for retarding the addition of Si-bonded hydrogen at an aliphatic double bond at room temperature. Examples of inhibitors are 1,3-divinyl-1,1,3,3-tetramethyldisiloxane, benzotriazole, dialkylformamides, alkylthioureas, thiuram monosulfides and disulfides, methyl ethyl ketoxime, organic or organosilicon compounds having a boiling point of at least 25° C. at 1012 mbar (abs.) and at least one aliphatic triple bond, such as 1-ethynylcyclohexan-1-ol, 2-methyl-2-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula $HC{\equiv}C-C(CH_3)(OH)-CH_2-CH_2-CH{=}C(CH_3)_2$, commercially available under the trade name "Dehydrolinalool", from BASF. The inhibitor is preferably used in amounts of from 0.001 to 0.5% by weight, more preferably from 0.01 to 0.1% by weight, based on the total weight of the composition.

Examples of further components which can be used in the compositions are fillers such as reinforcing and nonreinforcing fillers, plasticizers, adhesion promoters, soluble dyes, inorganic and organic pigments, fluorescent dyes, solvents, fungicides, fragrances, dispersants, rheological additives, corrosion inhibitors, antioxidants, light stabilizers, heat stabilizers, flame retardant agents, agents for influencing electrical properties and agents for improving thermoconductivity.

The sequence of mixing of the components (1) and (2), or (3) (instead of (1) and (2)), (4) and/or (5) and (6) and optionally further components is not critical, but it has proven useful in practice to add the component (6), i.e. the catalyst, last to the mixture of the other components.

The crosslinking of the compositions is preferably effected at from 70 to 170° C., more preferably from 100 to 150° C. Energy sources used for thermal crosslinking are preferably ovens, for example air circulation ovens, heating tunnels, heated rolls, heated plates or by heat radiation in the infrared range. The crosslinking times are preferably from 0.5 to 5 hours, preferably from 1 to 3 hours.

The invention furthermore relates to moldings produced by crosslinking the inventive compositions. If no further additives have been admixed, the moldings are transparent as glass and have a refractive index of from 1.47 to 1.60.

After complete curing, and without further additives such as fillers or plasticizers, the compositions preferably have a Shore D hardness of greater than 40, more preferably in the range from 40 to 70, and most preferably in the range from 50 to 60. The Shore D hardness is determined according to DIN (Deutsche Industrie Norm) [German Industrial Standard] 53505 (or ASTM D 2240 or ISO 868). In this standard, the Shore D scale is also compared with the hardness according to Shore A.

The compositions have the advantage that silicone resins having a final hardness of >40 Shore D may be obtained at lower curing temperatures than previously, without having to accept long curing times in return. Particularly in the case of potting and embedding compounds of electrical or electronic components such as LEDs, low curing temperatures are required. Furthermore, the comparatively low viscosities of the compositions permit their use as impregnating resins, for example of electrical insulating systems in motors, transformers and cables, in combination with other materials such as glass fabric, paper, glass-mica tapes, etc.

The silicone resin compositions according to the invention are suitable both for impregnating porous materials, for example those used in the area of electrical insulation material (for example glass fabrics, mica) and for the production of moldings, and also as potting and embedding compounds. Owing to the milder curing conditions in comparison with known silicone resins, the inventive formulations have especial advantages when processed together with temperature-sensitive components, e.g. electronic components, and in polymer molds.

Low viscosity and bubble-free curing make the formulations outstandingly suitable for impregnating large electrical insulation systems, as used, for example, in traction motors. The high thermal stability of the cured resins enables them to be used at operating temperatures above 200° C.

The compositions are particularly suitable for potting LEDs ("light emitting diodes"). Owing to their thermal and UV stability, cured materials thereof exhibit no decline in light transmittance even in the case of HB-LEDs ("high-brightness LEDs") and LEDs which emit light of short wavelength (380–450 nm) or white light, even after 40,000 hours of operation. The materials can be used for all LED designs which require chip masking. The mild curing conditions at 100–150° C. permit economical and fast manufacture of the LEDs. Furthermore, thermal stresses which may lead to cracks under thermal shock stress are reduced by the low curing temperature.

EXAMPLE 1

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 20 parts of a polysiloxane having the composition (MeViSiO)$_{0.9}$(Me$_2$SiOH)$_{0.1}$, 6 parts of a polysiloxane having the composition (MeHSiO)$_4$ and 0.04 part, based on platinum, of a platinum-1,3-divinyl-1,1,3,3-tetramethyldisiloxane complex as a hydrosilylation catalyst. A mixture having a viscosity of 520 cSt at 25° C. is obtained, and cured in a mold at 150° C. over the course of 1 hour. A molding transparent as glass and having a hardness of 64 Shore D is produced.

Comparative Experiment 1

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 0.04 part, based on platinum, of a platinum-1,3-divinyl-1,1,3,3-tetramethyldisiloxane complex as a hydrosilylation catalyst. A mixture having a viscosity of 1000 cSt at 25° C. is obtained, which is cured in a mold at 150° C. over the course of 1 hour. However, only a gelatinous material is obtained, the material cannot be removed from the mold, and has no measurable surface hardness.

EXAMPLE 2

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 30 parts of a polysiloxane having the composition (MeViSiO)$_{0.9}$(Me$_2$SiOH)$_{0.1}$, 6 parts of a polysiloxane having the composition (MeHSiO)$_4$ and 0.04 part, based on platinum, of a platinum-1,3-divinyl-1,1,3,3-tetramethyldisiloxane complex as a hydrosilylation catalyst. A mixture having a viscosity of 450 cSt at 25° C. is obtained, which is cured in a mold at 150° C. over the course of 1 hour. A molding transparent as glass and having a hardness of 52 Shore D is produced.

EXAMPLE 3

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 36 parts of a polysiloxane having the composition (MeViSiO)$_{0.9}$(Me$_2$SiOH)$_{0.1}$, 6 parts of a polysiloxane having the composition (MeHSiO)$_4$ and 0.04 part, based on platinum, of a platinum-1,3-divinyl-1,1,3,3-tetramethyldisiloxane complex as a hydrosilylation catalyst. A mixture having a viscosity of 390 cSt at 25° C. is obtained, which is cured in a mold at 150° C. over the course of 1 hour. A molding transparent as glass and having a hardness of 40 Shore D is produced.

EXAMPLE 4

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 40 parts of a polysiloxane having the composition (MeViSiO)$_{0.9}$(Me$_2$SiOH)$_{0.1}$, 46 parts of a polysiloxane having the composition (MeHSiO)$_4$ and 0.02 part, based on platinum, of a platinum-1,3-divinyl-1,1,3,3-tetramethyldisiloxane complex as a hydrosilylation catalyst. The mixture is heated to 100° C. for 5 min, producing a molding transparent as glass and having a hardness of 55 Shore D.

EXAMPLE 5

100 parts of a polysiloxane having the composition (PhSiO$_{3/2}$)$_{0.43}$(MeViSiO)$_{0.14}$(MeHSiO)$_{0.18}$(Me$_3$SiO$_{1/2}$)$_{0.25}$ are mixed together with 24 parts of a polysiloxane having the composition (MeViSiO)$_{0.9}$(Me$_2$SiOH)$_{0.1}$, 24 parts of a polysiloxane having the composition (MeHSiO)$_4$ and 0.04 part, based on platinum, of a platinum-1,3-divinyl-1,1,3,3-tetramethyldisiloxane complex as a hydrosilylation catalyst. The mixture is heated to 120° C. for 5 min, producing a molding transparent as glass and having a hardness of 40–45 Shore D.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An addition-crosslinking silicone resin composition comprising
   (1) 100 parts by weight of a polyorganosiloxane of the formula $$R^1_a R^2_b R^3_c SiO_{(4-a-b-c)/2} \qquad (I)$$

in which
   $R^1$ is a monovalent, aromatic, optionally substituted $C_{6-16}$ hydrocarbon radical,
   $R^2$ is a monovalent $C_{2-10}$ alkenyl radical,
   $R^3$ is a monovalent radical selected from the group consisting of $C_1$–$C_{18}$-alkyl radicals, $C_1$–$C_6$-alkoxy radicals, and hydroxyl radicals,
   a, b and c, per siloxane unit, are 0, 1, 2 or 3, with the proviso that the sum of a+b+c is $\leq 3$,
   and a, b and c, based on the average empirical formula (I), are on average
   $0.3 \leq a \leq 1.0$,
   $0.1 \leq b < 0.3$,
   $0.5 \leq c \leq 1.5$,
   the sum a+c being on average
   $1.0 \leq a+c < 2.0$,
   with the further proviso that at least two alkenyl radicals $R^2$, at least one aromatic radical $R^1$, and at least one unit of the formula $RSiO_{3/2}$ in which R is a radical $R^1$, $R^2$ or $R^3$, or $SiO_2$, are contained per molecule,
   (2) from 50 to 200 parts by weight of a polyorganosiloxane of the formula $$R^1_d H_e R^3_f SiO_{(4-d-e-f)/2} \qquad (II)$$

in which
   d, e and f, per siloxane unit, are 0, 1, 2 and 3, with the proviso that the sum d+e+f is $\leq 3$,
   and d, e and f, based on the average empirical formula (II), are on average
   $0.3 \leq d \leq 1.0$,
   $0.1 \leq e < 0.4$,
   $0.5 \leq f \leq 1.5$,
   the sum d+f being on average
   $1.0 \leq d+f \leq 2.0$,
   with the further proviso that at least two Si-bonded hydrogen atoms and at least one aromatic radical $R^1$ are contained per molecule,
   or, instead of the components (1) and (2),
   (3) 200 parts by weight of a polyorganosiloxane of the general formula $$R^1_g R^2_h R^3_i H_k SiO_{(4-g-h-i-k)/2} \qquad (III)$$

in which
   g, h, i and k, per siloxane unit, are 0, 1, 2 and 3, with the proviso that the sum g+h+i+k is $\leq 3$,
   and g, h, i and k, based on the average empirical formula (III), are on average
   $0.3 \leq g \leq 1.0$,
   $0.1 \leq h < 0.3$,
   $0.5 \leq i \leq 1.5$,
   $0.1 \leq k < 0.4$,
   the sum of g+i being on average
   $1.0 \leq g+i \leq 2.0$,
   and the ratio of h to k is on average
   $0.7 \leq h/k \leq 1.3$,
   with the proviso that at least two alkenyl radicals $R^2$, at least two Si-bonded hydrogen atoms, at least one aromatic radical $R^1$ and at least one unit of the formula $RSiO_{3/2}$ in which R is a radical $R^1$, $R^2$ or $R^3$, or $SiO_2$, are contained per molecule, (4) from 1 to 100 parts by weight of an alkenyl-rich polyorganosiloxane of the formula $$R^1_l R^2_m R^3_n SiO_{(4-l-m-n)/2} \qquad (IV)$$

in which
   l, m and n, per siloxane unit, are 0, 1, 2 and 3, with the proviso that the sum l+m+n is $\leq 3$,
   and l, m and n, based on the average empirical formula (IV), are on average
   $0 \leq l \leq 0.5$,
   $0.6 \leq m \leq 1.0$,
   $0.5 \leq n \leq 2$,
   the sum l+m+n being on average
   $1.0 \leq l+m+n \leq 2.5$,
   with the further proviso that at least two alkenyl radicals $R^2$ are contained per molecule,
   and, additionally or instead of component (4),
   (5) from 1 to 100 parts by weight of a hydrogen-rich polyorganosiloxane of the formula $$R^1_o H_p R^3_q SiO_{(4-o-p-q)/2} \qquad (V)$$

in which
   o, p and q, per siloxane unit, are 0, 1, 2 and 3, with the proviso that the sum o+p+q is $\leq 3$,
   and o, p and q, based on the average empirical formula (V), are on average
   $0 \leq o \leq 0.5$,
   $0.6 \leq p \leq 1.0$,
   $0.5 \leq q \leq 2$,
   the sum o+p+q being on average
   $1.0 \leq o+p+q \leq 2.5$,
   with the further proviso that at least two Si-bonded hydrogen atoms are contained per molecule, and
   (6) a catalyst which promotes the addition of Si-bonded hydrogen to aliphatic double bonds.

2. The addition-crosslinking silicone resin composition of claim 1, wherein $R^1$ is a phenyl radical and $R^2$ is a vinyl radical.

3. The addition-crosslinking silicone resin composition of claim 1, wherein, in formula (I), b is on average $0.1 \leq b < 0.25$ and the sum a+c is on average $1.4 \leq a+c \leq 1.8$.

4. The addition-crosslinking silicone resin composition of claim 1, wherein, in formula (II), e is on average $0.1 \leq e \leq 0.25$.

5. The addition-crosslinking silicone resin composition of claim 1, wherein, in formula (III),
   h is on average $0.1 \leq h \leq 0.2$,
   k is on average $0.1 \leq k \leq 0.2$,
   the sum g+i is on average
   $1.4 \leq g+i \leq 1.8$,
   and the ratio of h to k is on average
   $0.8 \leq h/k \leq 1.1$.

6. The addition-crosslinking silicone resin composition of claim 1, wherein, in formula (IV), m is on average $0.8 \leq m \leq 1.0$.

7. The addition-crosslinking silicone resin composition of claim 1, wherein, in formula (V), p is on average $0.8 \leq p \leq 1.0$.

8. A molding produced by crosslinking the composition of claim 1.

9. A molding produced by crosslinking the composition of claim 2.

10. A molding produced by crosslinking the composition of claim 3.

11. A molding produced by crosslinking the composition of claim 4.

12. A molding produced by crosslinking the composition of claim 5.

13. A molding produced by crosslinking the composition of claim 6.

14. A molding produced by crosslinking the composition of claim 7.

15. The molding of claim 8, wherein the Shore D hardness is greater than 40.

16. A process for potting or embedding of electrical or electronic components comprising applying the composition of claim 1 to said component and curing the same.

17. The process of claim 16, wherein said electronic component comprises a light emitting diode.

* * * * *